United States Patent
Barnes et al.

(10) Patent No.: US 6,264,162 B1
(45) Date of Patent: Jul. 24, 2001

(54) BREAKAWAY SIGN POST

(76) Inventors: Theodore D. Barnes, 4829 S. Tierney Dr., Independence, MO (US) 64055; Darren Potter, 416 Lisa La., Maryville, MO (US) 64468

( * ) Notice: Subject to any disclaimer, the term of this patent is extended or adjusted under 35 U.S.C. 154(b) by 0 days.

(21) Appl. No.: 09/334,032

(22) Filed: Jun. 15, 1999

(51) Int. Cl.[7] .................................................. F16M 13/00
(52) U.S. Cl. ............................. 248/548; 248/909; 403/2; 52/98
(58) Field of Search .................................... 248/158, 511, 248/530, 533, 909, 548, 900; 52/98, 55, 99, 298, 726.1; 403/2, 305; 404/10

(56) References Cited

U.S. PATENT DOCUMENTS

| | | | |
|---|---|---|---|
| 3,349,531 | * 10/1967 | Watson | .................................. 52/296 |
| 3,820,906 | * 6/1974 | Katt | ......................................... 403/2 |
| 3,846,030 | * 11/1974 | Katt | ......................................... 403/2 |
| 4,490,062 | * 12/1984 | Chisholm | ................................ 403/2 |
| 4,926,592 | * 5/1990 | Nehls | ........................................ 52/98 |
| 4,928,446 | * 5/1990 | Alexander, Sr. | ........................ 52/98 |
| 5,088,683 | 2/1992 | Briden . | |
| 5,160,111 | 11/1992 | Hugron . | |
| 5,214,886 | * 6/1993 | Hugron | ..................................... 52/98 |
| 5,480,121 | 1/1996 | Rice et al. . | |
| 5,484,217 | 1/1996 | Carroll et al. . | |
| 5,535,555 | 7/1996 | Boyd et al. . | |
| 5,782,040 | * 7/1998 | McCartan | ................................. 52/98 |
| 5,988,598 | * 11/1999 | Sicking et al. | ..................... 256/13.1 |

* cited by examiner

Primary Examiner—Anita M. King
(74) Attorney, Agent, or Firm—Hovey, Williams, Timmons & Collins (57) ABSTRACT

A breakaway sign post assembly (30) is disclosed as including a sign support post (32), an anchoring post (34) and a breakaway collar (100). The breakaway collar (100) includes a sidewall (102) which surrounds the sign support post (32). The sidewall (102) includes at least one substantially vertical line of weakness (120) configured to facilitate a portion of the sidewall (102) to give way. The sidewall (102) retains the sign support post (32) in a manner to define a fulcrum (134) about which the sign support post (32) turns when a vehicle impacts and exerts a lateral force at an impact location, with the fulcrum (134) being positioned below the impact location so that the support post (32) will swing generally away from the vehicle.

25 Claims, 5 Drawing Sheets

BREAKAWAY SIGN POST

BACKGROUND OF THE INVENTION

1. Field of the Invention

This invention relates to the field of posts, barriers and support structures. More particularly, the invention is concerned with a breakaway sign post collar which directs the location of fall of a sign post when impacted by a vehicle.

2. Description of the Prior Art

Posts of many different varieties are used in association with roadways. They are used for signs, providing information to the vehicle operators, and barriers, directing vehicles away from hazardous areas. Most posts along a roadway are fixed to the ground by digging a post hole, inserting the post into the hole and then filling the hole with concrete or other material to support the post.

These posts are often hit by vehicles using the roadways, which usually results in the breaking of the post. When the post breaks, the top portion of the post can rotate toward the vehicle and possibly enter the passenger compartment. This can result in serious injuries for the occupants or even death.

A further problem with the posts currently in use is the difficulty in replacing the post once it has been broken. To reinstall the post, the original concrete must be dug up and removed. Then, a new post is inserted into the hole and new concrete poured in to fix it in place. This is labor intensive and requires several man hours for each post that is broken.

There has thus developed a need for a sign post that provides a measure of safety by directing the fall of the post when struck by a vehicle and yet is simple and inexpensive to reinstall after a being impacted by the vehicle.

SUMMARY OF THE INVENTION

The present invention solves the problems mentioned above and provides a distinct advance in the state of the art. In particular, the breakaway sign post assembly hereof directs the fall of a sign post, when the post is struck by a vehicle, and is both economical and easy to replace when broke.

The breakaway sign post assembly of the present invention broadly includes a sign support post and a breakaway collar. The collar includes a sidewall that at least substantially extends about the support post and is configured to support the sign post in an upright orientation. The sidewall retains the support post in a manner to define a fulcrum about which the sign support post turns when a vehicle impacts and exerts a lateral force at an impact location on the support post. The fulcrum is positioned below the impact location so that the support post will swing generally away from the vehicle. The sidewall includes a zone of weakness projecting from the top edge toward the fulcrum and being configured to facilitate a portion of the sidewall to give way allowing the support post to turn about the fulcrum when the lateral force is exerted against the impact location.

In preferred forms, the breakaway sign post assembly includes an anchoring post to which the breakaway collar is removably fastened. The line of weakness may be a pair of open slots located opposite the impact location. The anchoring post and the sign support post are each an I-beam, formed from synthetic resin material. Further, the sign support post is removably attached to the breakaway collar by an adhesive. The resulting breakaway sign post assembly controls the direction of the sign support post's fall, while being easier and more economic to replace after a vehicular accident.

DETAILED DESCRIPTION OF THE PREFERRED EMBODIMENTS

The drawing figures illustrate a preferred breakaway sign post assembly 30 constructed in accordance with the present invention. The breakaway sign post assembly 30 generally comprises a sign support post 32, an anchoring post 34 and a breakaway collar 100.

Figure 1:
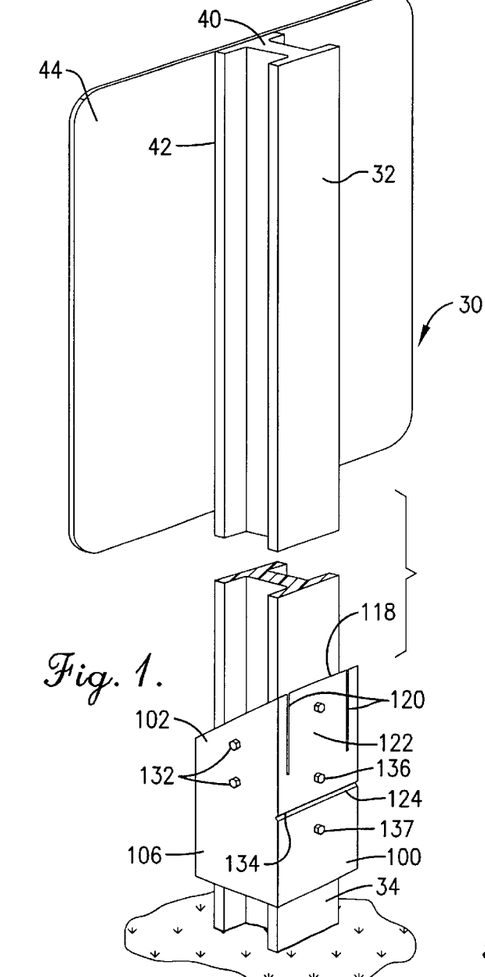
FIG. 1 is a partial pictorial view of an assembled breakaway sign post assembly in accordance with the present invention.

The sign support post 32 is an elongated post presenting a bottom end 38 and a top end 40. As shown in FIG. 1, the top end 40 presents a front face 42 on which a sign 44 or some other type of information conveying device may be attached. The sign support post 32 is preferably integrally formed from synthetic resin material such as high density polyethylene, but other suitable materials such as metal or even wood could be used for the sign support post 32. The sign support post 32 preferably comprises a so-called "I-beam" so as to decrease the amount of material used without sacrificing any strength characteristics. However, any suitable shape such as a circle, square, or other polygonal cross-sections could be used.

The anchoring post 34 presents an anchoring end 46 and a supporting end 48. The material and shape for the anchoring post 34 are preferably the same as for the sign support post 32. Also, the anchoring end 46 could be shaped for increased stability in the ground.

The breakaway collar 100 is preferably integrally formed of synthetic resin material such as high density polyethylene. However, any material with comparable characteristics could also be employed. The first embodiment of breakaway collar 100 is shown in FIGS. 1–5. This breakaway collar is unidirectional so as to be designed for impact from only a single direction. The breakaway collar 100 comprises a first sidewall 102, defining a first recess 104, a second sidewall 106, defining a second recess 108, and a floor 110 separating the recesses 104,108. The first sidewall is generally rectangular in transverse cross-section. The first sidewall 102 presents a front 112, a back 114, a pair of sides 116 and an uppermost top edge 118. The front 112, back 114 and sides 116 are all preferably about half an inch thick, about 6 inches tall, and 4 ½ inches wide (measured from corner to corner), but the dimensions could be varied.

Figure 2:
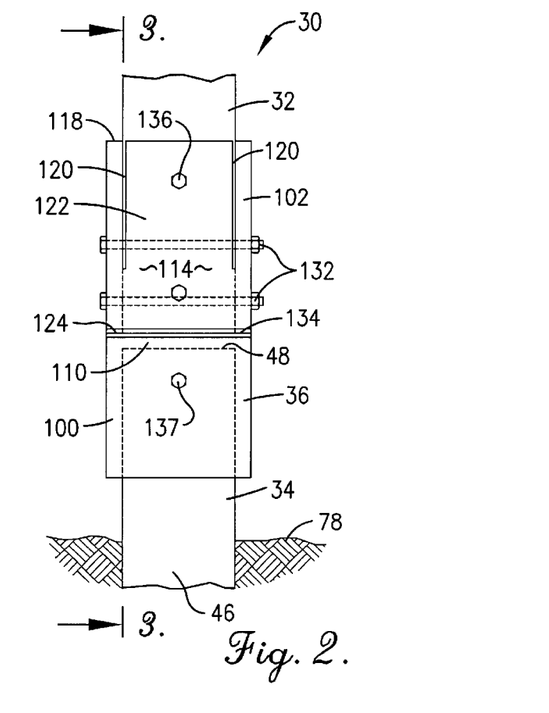
FIG. 2 is a fragmentary rear view of the breakaway sign post assembly of FIG. 1.
Figure 3:
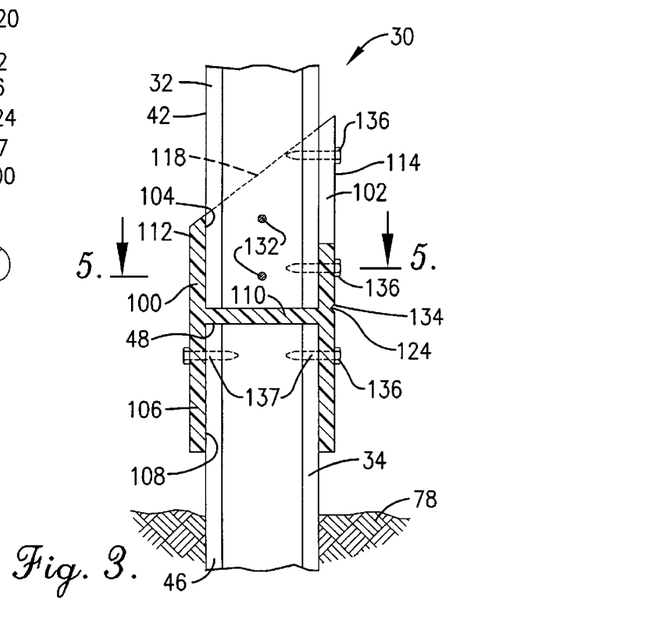
FIG. 3 is a sectional view taken along line 3—3 of FIG. 2.
Figure 4:
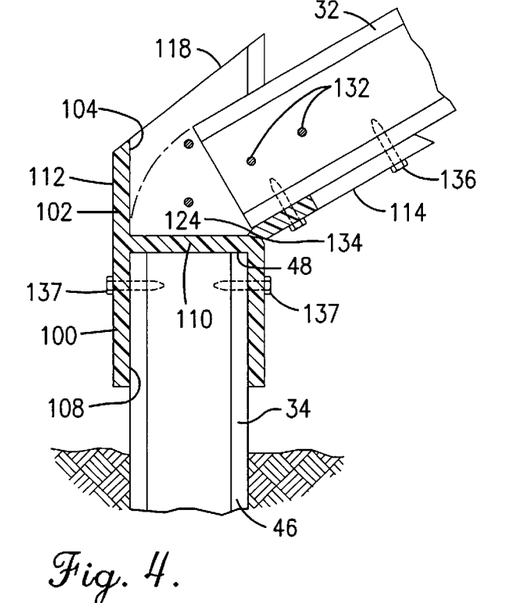
FIG. 4 is a sectional view taken along line 3—3 of FIG. 2, showing the sign support beam turning above the fulcrum upon impact.
Figure 5:
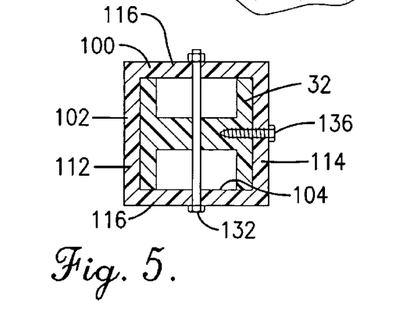
FIG. 5 is a sectional view taken along line 5—5 of FIG. 3.
Figure 6:
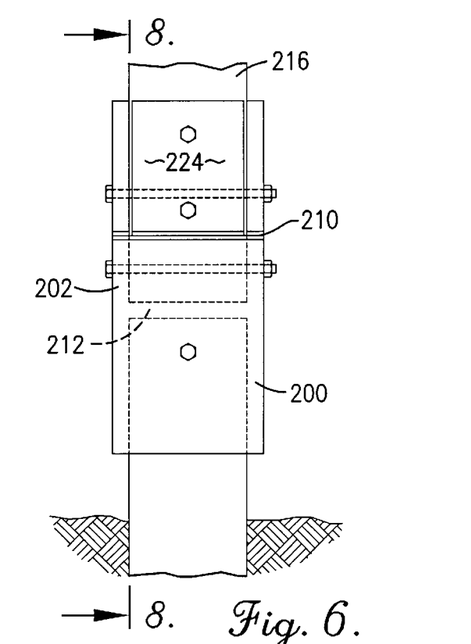
FIG. 6 is a fragmentary rear view of a second embodiment of the inventive breakaway sign post assembly similar to that shown in FIG. 1, but having a fulcrum point spaced relatively farther from the end of the support beam.
Figure 7:
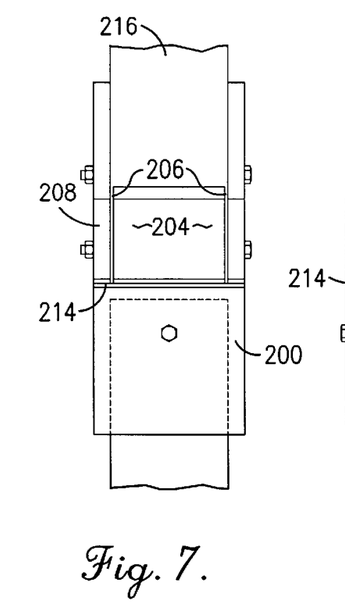
FIG. 7 is a fragmentary front view of the breakaway sign post assembly of FIG. 6.
Figures 8, 9:
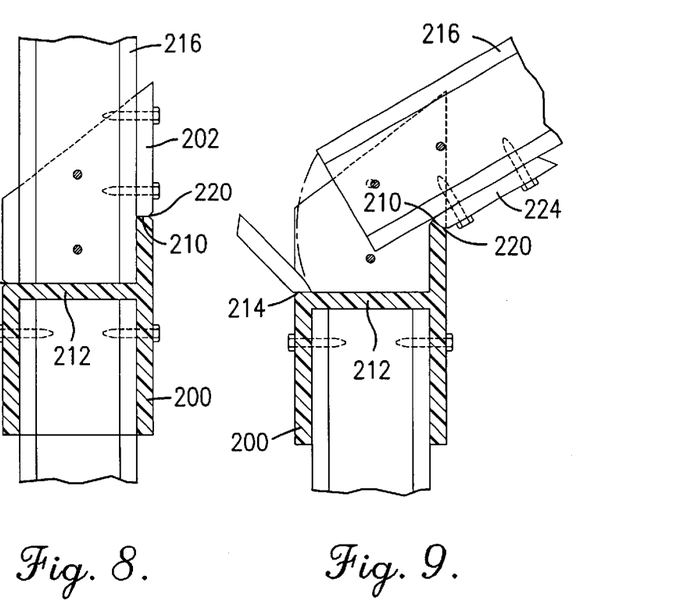
FIG. 8 is a sectional view taken along line 8—8 of FIG. 6.
FIG. 9 is a sectional view similar to FIG. 8, but showing the sign support beam tuning about the fulcrum upon impact.

As shown in FIG. 3, the uppermost top edge 118 of first sidewall 102 can be inclined from the front 112 to the back 114. Refining again to FIG. 2, the first sidewall 102 of the first embodiment of the unidirectional collar 100 includes a zone of weakness, preferably in the form of a pair of lines of weakness 120 that project downwardly from the top edge 118. The lines of weakness 120 are located on the back 114 of the first sidewall 102 in general alignment with the sides of the support post 32. The lines of weakness 120 are preferably open slots in the sidewall 102, but could also be a portion of the first sidewall 102 that has reduced thickness or has been scored to decrease the strength along the substantially vertical line. The vertical lines of weakness 120 do not reach the floor 110, but could extend all the way to the floor. In between the weakness lines 120 is a portion 122 of the back 114 of the sidewall 102, with the wall portion 122 consequently being generally as wide as the sign support post 32. As will subsequently be described, the wall portion 122 between the weakness lines 120 is designed to give way or bend relative to the remaining portion of the sidewall 102 when the support beam 32 is impacted.

The first sidewall 102 also includes at least one hinge line 124. The hinge line 124 is located on the back 112 of the first sidewall 102. The hinge line 124 is preferably a V-shaped groove that causes the sidewall to be of reduced thickness, although scoring or any other method known to one skilled in the art to make an area of the collar more susceptible to bending may be used to form the hinge 124. The hinge 124 essentially defines a line of weakness along the back 114 of the sidewall 102. The hinge hinge 124 is particularly useful in controlling the bending of the wall portion 122 defined between the slots 120. That is to say, when a sufficient force is exerted against the front of the wall portion 122, the hinge 124 will likely define the line about which the wall portion 122 bends. It is noted that the open slots 120 terminate short of the hinge 124 (i.e., the bottom ends of the slots 120 are spaced from the hinge 124), and accordingly, the portion 122 of the sidewall 102 defined therebetween will be required to tear or shear to permit bending of the wall portion 122 about the hinge 124. However, it is believed that the ends of the slots 120 define stress concentration points that facilitate such tearing or shearing. It is also noted that the hinge 124 is located generally the same distance from the top edge 118 of the sidewall 102 as the floor 110. In this respect, the wall portion 122, which is designed to give way, extends essentially from the top edge 118 to the floor 110 and is bendable about the hinge 124.

The preferred second side wall 106 is also generally rectangular in transverse cross-section and presents the same dimension as the first side wall 102, although the side walls 102,106 need not be of the same shape and size. It is again noted that the floor 110 is located between and separates the generally opposite facing first and second recesses 104, 108. The anchoring post 34 is attached to the second sidewall 106 using screws 137. Other fasteners or fastening methods which are able to securely hold the anchoring post 34 to the second sidewall 106 can also be used.

In operation, the anchoring end 46 of the anchoring post 34 is fixed to the ground 78. This can be accomplished by any method known by those skilled in the art. For instance, a hole could be dug in the ground, the anchoring post 34 placed into the hole and then the rest of the hole filled with concrete. The support end 48 of the anchoring post 34 should be about four inches from the ground 78.

Once the anchoring post 34 is fixed, the unidirectional breakaway collar 100 is placed on the support end 48 of the anchoring post 34 with the floor 110 contacting the support end 48. The collar 100 is removably fastened to the anchoring post 34 so that the front 112 of the first sidewall 102 generally faces toward the vehicular traffic. The collar 100 can be fastened by adhesive or by a fastener 137 such as a screw or nut and bolt. A suitable adhesive is sold under the trademark ELASTENE, as part number 1357013, by Macco Adhesives, of Cleveland, Ohio 44115.

Next, the sign support post 32 is inserted into the first recess 104 so that the sidewall 102 extends about the bottom end 38 of the support post 32. The breakaway collar 100 is configured to support the sign support post 32 in an upright orientation. The sign support post 32 is fastened to the back 114 of the unidirectional collar 100 using fasteners 136, although other suitable means (e.g., adhesive, spot welding or nuts and bolts) may be used. A pair of shearable nut and bolt assemblies 132 project through the support post 32 and sides 116 to assist with such attachment yet permit movement of the post 32 relative to the sides when a sufficient force is exerted against the front of the post 32.

It should be apparent from the foregoing that the first sidewall 102 releasably retains the support post 32 in an upright condition. That is, the first sidewall 102 maintains the support post 32 upright and generally in axial alignment with the anchor post 34, until a sufficient load is exerted against the front 112 of the post 32. Assuming such an impact is above the floor 110, the sidewall 102 will at least initially restrict movement of the bottom end 38 of the support post 32 so as to define a fulcrum 134 about which the support post 32 turns. The open slots facilitate turning movement of the post about the fulcrum 134 by allowing the portion 122 of the first sidewall 102 to give way. Moreover, the wall portion 122 will likely bend about the hinge 124 and, because the support post is attached to the wall portion 122 by the screws 136, the post 32 will also turn about the hinge 124. Accordingly, it is believed that the fulcrum 134 for the support post 32 will likely be defined at the hinge 124. It is also noted that such turning of the support post 32 will cause the nut and bolt assemblies 132 to sheer, and these assemblies must be designed to fail accordingly.

Thus, when a vehicle strikes the front 112 of the support post 32 and thereby exerts a generally lateral or rearward force against the post 32, the post will predictably turn generally away from the vehicle (i.e., the top end 40 of the post 32 will swing away from the vehicle) about a point defined generally at the hinge 124. This predictable failure sequence of course assumes that the impact location is above the fulcrum 134, and the breakaway collar 100 is consequently designed and positioned to locate the fulcrum 134 at a point sufficiently close to the ground 78 to ensure that virtually all vehicular impact will occur above the fulcrum 134.

Replacement of the collar 100 simply requires detachment from the anchor post 34 and then installation of a new collar and in some cases, a new support post 32, as described hereinabove. In the illustrated embodiment, detachment if the collar 100 requires only removal of the screws 137. If the support post 32 has not been damaged and can be reused, it may be similarly detached from the failed collar by removing screws 136 and then attached to the new collar.

A second embodiment of the present invention is illustrated in FIGS. 6–9, with the breakaway collar 200 of the second embodiment being similar to the collar 100 shown in FIGS. 1–5 in the sense that the collar is unidirectional. However, the collar 200 defines the fulcrum 220 for the support post 216 at a different location. It is particularly noted that the first sidewall 202 includes a second portion 204 located on the front 208 of the sidewall 202 between a second pair of substantially vertical lines of weakness 206. A second hinge line 214 is also positioned on the front 208 of the first sidewall 202. Further, the first hinge line 210 is spaced higher relative to the floor 212 than on the first collar 100.

In operation, as the vehicle strikes the sign support post 216 at an impact location (not shown) above the floor 212, the post 216 should predictably turn about the higher fulcrum 220. It is particularly noted that the omnidirectional collar 200 accommodates vehicular impact on any side of the support post 216. In order to turn about the fulcrum 220, the bottom end 222 of the post 216 must swing through an arc intersecting the front 208 of the sidewall 202. The pressure exerted by the bottom end 222 on the front 208 of the sidewall 202 causes the second portion 204 of the sidewall to give way about the second hinge 214. It is believed that the second portion 204 and first portion 224 of the sidewall 202 give way at generally the same time as the post 216 turns predictably away from the vehicle.

Figures 10, 11, 12:
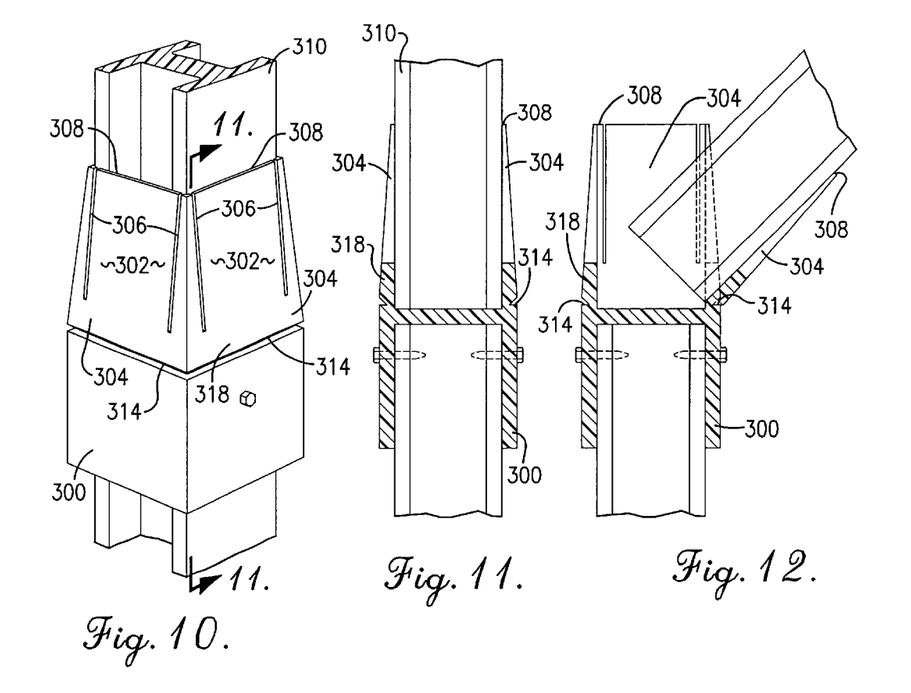
FIG. 10 is a fragmentary perspective view of a third embodiment of the present invention, wherein the breakaway collar is omnidirectional so that the support beam swings properly away from the vehicle when impacted by the vehicle on any one of its four sides.
FIG. 11 is a sectional view taken along line 11—11 of FIG. 10.
FIG. 12 is a sectional view similar to FIG. 11, but showing the sign support beam turning about fulcrum upon impact.

A third embodiment of the present invention is illustrated in FIGS. 10–12. The breakaway collar 300 operates from the same principles as the breakaway collar 100 of the first embodiment, but the collar 300 is "omnidirectional". That is, the collar 300 is similar to the collar of the first embodiment, but each side 304 of the collar 300 includes a portion 302 of the sidewall 318 designed to give way or bend relative to the remaining portion of the sidewall 318 when the support post 310 is impacted.

The breakaway collar 300 further includes a hinge line 314 that extends around its entire perimeter. Also, each side 304 of the collar 300 is tapered as you move from the hinge 314 to the uppermost top edge 308. It is believed that tapering reduces the risk of collar failure along the hinge line 314 before the wall portion 302 opposite the impact location gives way. Each side 304 includes a pair of substantially vertical lines of weakness 306. Preferably, the lines of weakness 306 are open slots which extend downward from the uppermost top edge 308.

By having a portion 302 of each side 304 configured to give way, the breakaway collar 300 is able to direct the fall of the sign support post 310 when impacted by a vehicle from any one of its sides. The post 310 will predictably turn generally away from the vehicle about a point defined generally at the hinge line 314.

Figure 13:
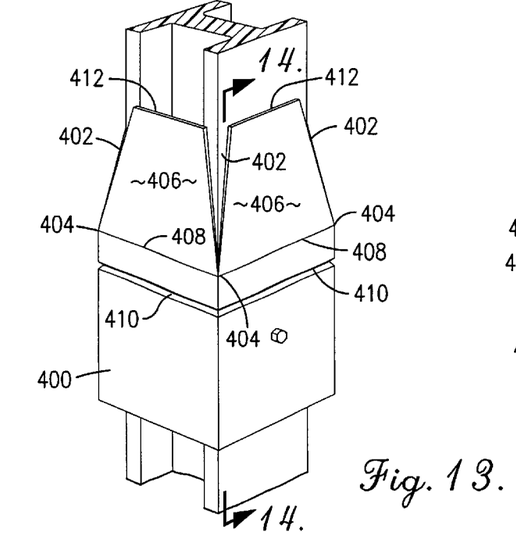
FIG. 13 is a fragmentary perspective view of a fourth embodiment of the present invention, wherein the breakaway collar is omnidirectional similar to the embodiment shown in FIGS. 10–12, but has open slots at the corners.
Figure 14:
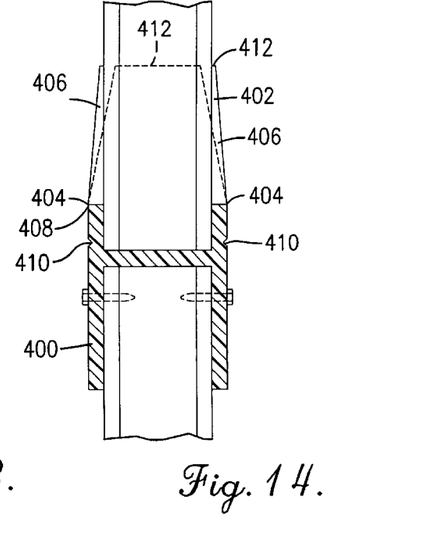
FIG. 14 is a sectional view taken along line 14—14 of FIG. 13.
Figures 15, 16:
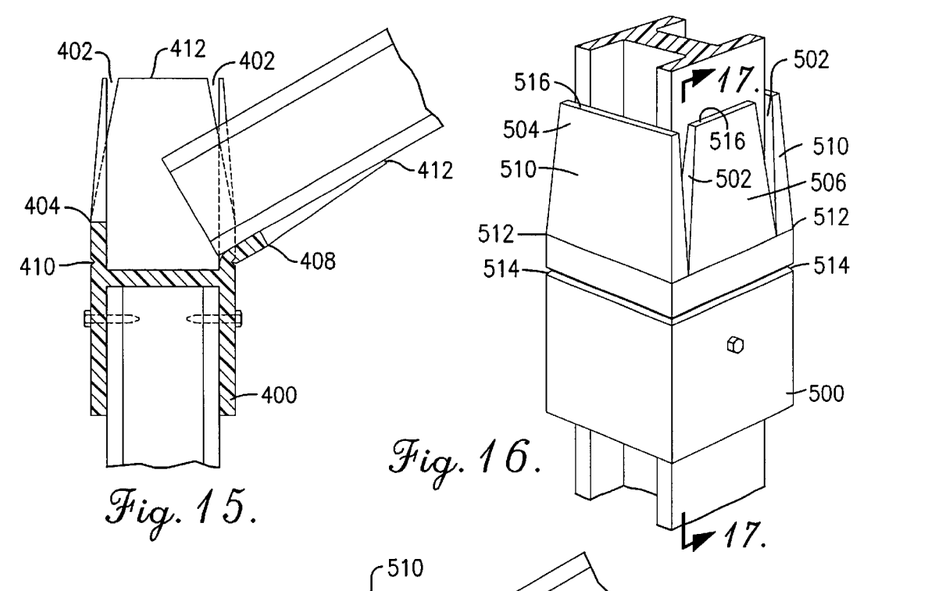
FIG. 15 is a sectional view similar to FIG. 14, but showing the sign support beam turning about the fulcrum upon impact.
FIG. 16 is a fragmentary perspective view of a fifth embodiment of the present invention, wherein the breakaway collar is omnidirectional similar to the embodiment show FIGS. 13–15 but has wedge-shaped open slots defined along just two sides.

A fourth embodiment of present invention is illustrated in FIGS. 13–15, with the breakaway collar 400 of the fourth embodiment being similar to the collar 300 shown in FIGS. 10–12, in the sense that the collar is omnidirectional. However, the collar 400 includes open slots 402 at each of the corners 404 of the rectangular cross-section. Also, the sides 406 of the breakaway collar 400 are each tapered from a line 408 spaced above the hinge line 410 to the uppermost top edge 412. Further, each side 406 decreases in width from that same line 408 towards the top edge 412. Thus, each vertical slot 402 increases in width from the line 408 to the top edge 412.

Figures 17, 18, 19:
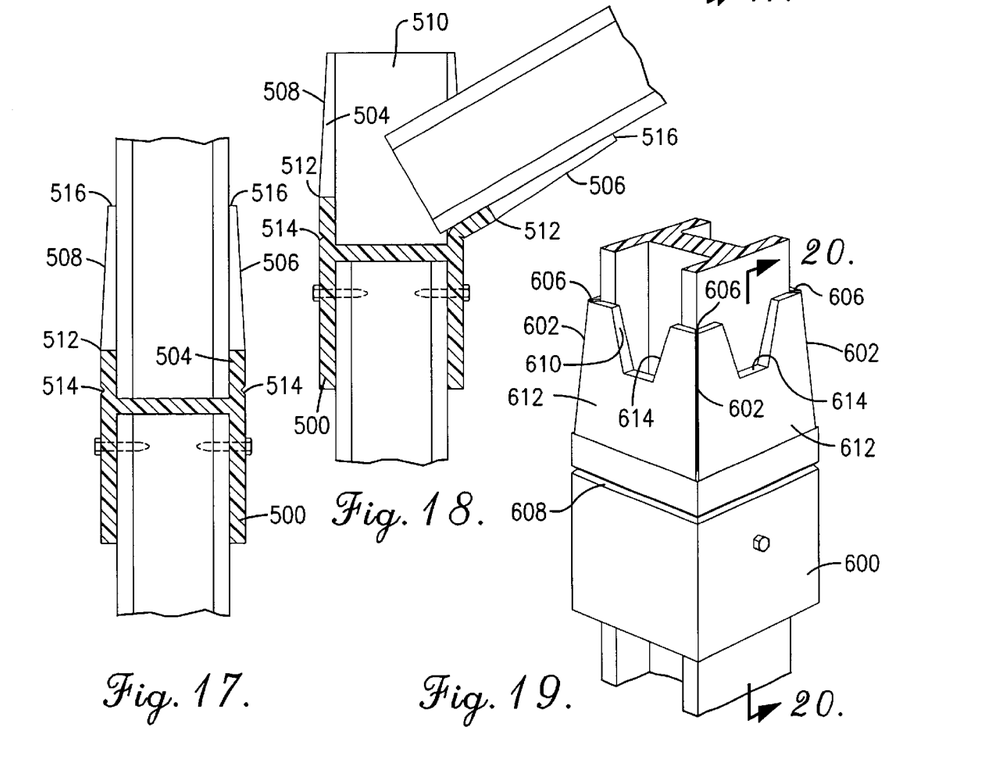
FIG. 17 is a sectional view taken along line 17—17 of FIG. 16.
FIG. 18 is a sectional view similar to FIG. 17, but showing the sign support beam turning about the fulcrum upon impact.
FIG. 19 is a fragmentary perspective view of a sixth embodiment of the present invention, wherein the breakaway collar is omnidirectional and is provided with notches in its uppermost top edge and open slots at its corners.

A fifth embodiment of present invention is illustrated in FIGS. 16–18, with the breakaway collar 500 of the fifth embodiment being similar to the collar 300 shown in FIGS. 10–12, in the sense that the collar is omnidirectional. However, the collar 500 includes wedge shaped open slots 502 defined along the front 506 and the back 508 of the sidewall 504. Two slots 502 are located on the front 506 and two slots 502 are located on the back 508. The front 506 and back 508 of the sidewall 504 are smaller in width than either side 510. Further, the front 506 and back 508 decrease in width from a line 512 spaced above the hinge line 514 toward the top edge 516. Thus, each vertical slot 502 increases in width from the line 512 to the top edge 516. Unlike the front 506 and back 508, neither of the sides 510 decrease in width.

Figure 20:
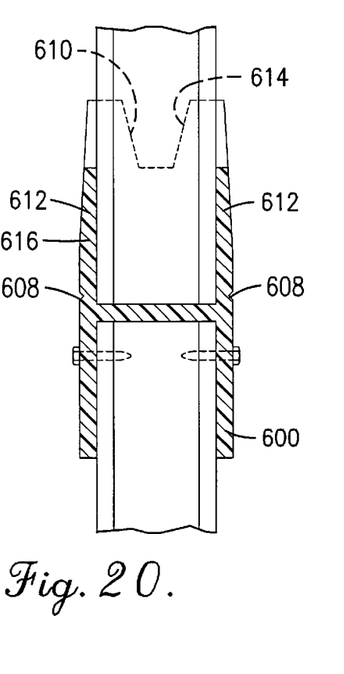
FIG. 20 is a sectional view taken along line 20—20 of FIG. 19.
Figure 21:
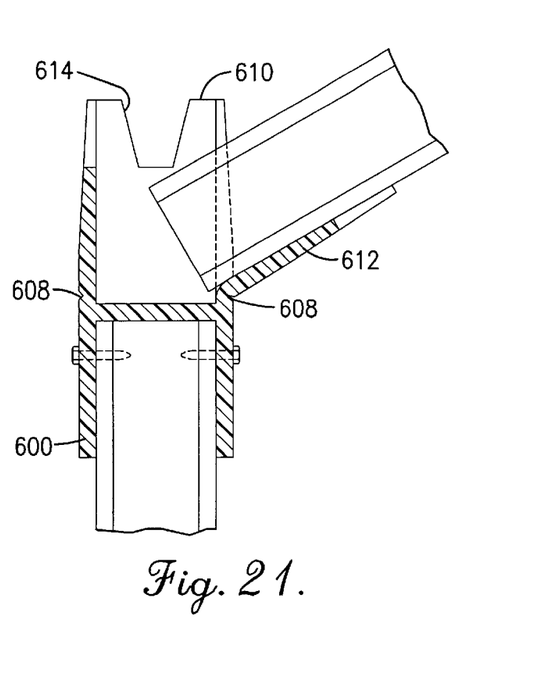
FIG. 21 is a sectional view similar to FIG. 20, but showing the sign support beam turning able fulcrum upon impact.

A sixth embodiment of present invention is illustrated in FIGS. 19–21 with the breakaway collar 600 of the sixth embodiment being similar to the collar 300 shown in FIGS. 10–12 in the sense that the collar is omnidirectional. However, the collar 600 includes open slots 602 at each of the corners 606 of the rectangular cross-section. Further, the collar 600 is provided with notches 614 on each side 612 of its uppermost top edge 610. The notches 614 are generally centrally located along the top edge 610 of each side 612. The notch 614 allows the collar 600 to be formed with less material and it further reduces the risk of collar failure along the hinge line 608 before the side 612 is permitted to bend about the hinge line 608 as desired.

Figure 22:
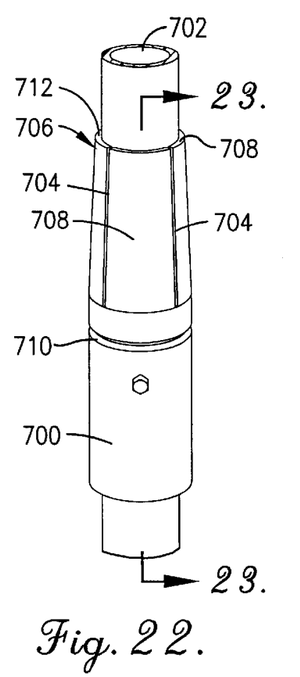
FIG. 22 is a fragmentary perspective view of a seventh embodiment of the present invention, wherein the breakaway collar is omnidirectional and cylindrical in shape so as to properly swing away from the vehicle when the impact comes from virtually any direction.
Figure 23:
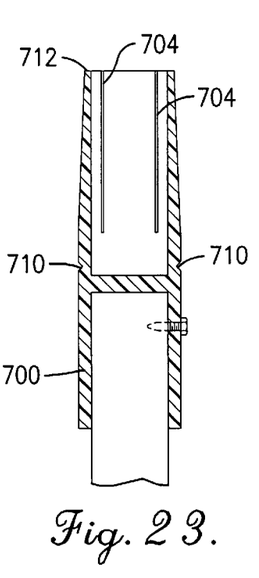
FIG. 23 is a sectional view taken along line 23—23 of FIG. 22.
Figure 24:
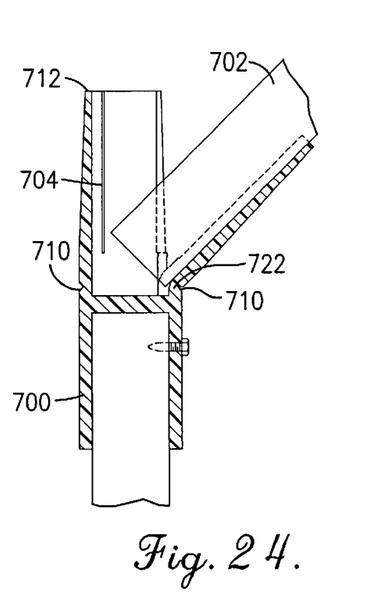
FIG. 24 is a sectional view similar to FIG. 23, but showing the sign support beam turning about the fulcrum upon impact.

A seventh embodiment of present invention is illustrated in FIGS. 22–24 with the breakaway collar 700 of the seventh embodiment being similar to the collar 300 shown in FIGS. 10–12 in the sense that the collar is omnidirectional. However, the collar 700 is cylindrical in shape so as to properly swing away from the vehicle when the impact comes from virtually any direction. The cylindrical shape allows the collar 700 to be used with a cylindrical sign support post 702. The slots 704 project from the uppermost top edge 712 and are circumferentially spaced from each other around the circumference 706. The lines of weakness 704 are preferably spaced every ninety degrees, although the slots 704 could be spaced in other increments (i.e. every forty-five or sixty degrees). Each portion 708 tapers from the hinge line 710 to the uppermost top edge 712.

In operation the collar 700 at the seventh embodiment operates similar to the collar 300 of the third embodiment. The only notable difference is the operation of the arc portions 708 when a collision occurs. The portion 708 on the side generally opposite from the impact location (not shown) is configured to give way, bending about the circumferential hinge 710. In other words, any portion 708 that is more than ninety degrees around the circumference 706 from the point of impact will bend sufficiently to allow the sign support post 702 to tun about the fulcrum 722, generally away from the impacting vehicle.

Each of the omnidirectional collars 300,400,500,600,700 is preferably attached to the sign support posts using an adhesive. A suitable adhesive is sold under the trademark ELASTENE, as part number 1357013, by Macco Adhesives, of Cleveland, Ohio 44115. However, a spot weld or a pair of shear screws could also be employed. The adhesive must prevent the sign support posts from being pulled out of the breakaway collar by vandals or high winds, while still allowing the sign support post to be released from the collar (i.e., detached from the "non-bending portions of the sidewall) as the sign support post turns away from an impacting vehicle.

Those skilled in the art will now appreciate the benefits of the present invention. For example, the ability to remove a broken collar from the anchoring post and replace it with a new breakaway collar saves labor. The sign support post and the anchoring post are reusable, thus saving material. Another benefit of the design is that safety is increased because the sign support post turns and lays down away from the impacting vehicle. A further benefit is that the materials preferably used are environmentally friendly. Instead of cutting down trees to replace a broken sign post, recycled plastic can be employed.

Those skilled in the art will also appreciate that the present invention encompasses many variations in the preferred embodiments described herein. The preferred embodiment uses integrally formed synthetic resin I-beams for the sign support post and anchoring post, but various other materials and post shapes may be used. As another example, the sign support post and anchoring post are built to be reusable, but either one or both could be replaced after a vehicular collision. The shape of the breakaway collar is rectangular or circular in cross-section, but other polygonal shapes could also be used. Additionally, the hinge lines could be slots, small scoring or not used at all.

Having thus described the preferred embodiments of the present invention, the following is claimed as new and desired to be secured by letters patent:

What is claimed is:

1. A breakaway collar configured to support a sign support post on an anchoring post in a manner to cause the sign support post to swing generally away from a vehicle when the vehicle impacts and exerts a lateral force against the sign support post, the breakaway collar comprising:

a body configured to be removably supported on the anchoring post, said body including an upper sidewall that is configured to at least substantially extend around the sign support post and presents an uppermost top edge when the collar is supported on the anchoring post, said upper sidewall including a zone of weakness projecting downwardly from the uppermost top edge and configured to facilitate a portion of the sidewall to give way when the lateral force is imparted to the sidewall by the sign support post.

2. A breakaway collar configured to support a sign support post on an anchoring post in a manner to cause the sign support post to swing generally away from a vehicle when the vehicle impacts and exerts a lateral force against the sign support post, the breakaway collar comprising:

a body configured to be removably supported on the anchoring post, said body including an upper sidewall that is configured to at least substantially extend around the sign support post and presents an uppermost top edge when the collar is supported on the anchoring post, said upper sidewall including a zone of weakness projecting from the uppermost top edge and configured to facilitate a portion of the sidewall to give way when the lateral force is imparted to the sidewall by the sign support post, said sidewall being polygonal in shape to present a plurality of sides, said zone of weakness comprising a pair of spaced apart, substantially vertical lines of weakness in each of the sides of the sidewall.

3. A breakaway sign post assembly comprising:

a sign support post; and a breakaway collar configured to support the sign support post in an upright orientation, said collar including a sidewall that at least substantially extends about the support post and presents an uppermost top edge, said sidewall retaining the support post in a manner to define a fulcrum about which the sign support post turns when a vehicle impacts and exerts a lateral force at an impact location on the support post, with the fulcrum being positioned below the impact location so that the support post will swing generally away from the vehicle, said sidewall including a zone of weakness projecting downwardly from the top edge toward the fulcrum and being configured to facilitate a portion of the sidewall to give way so that the support post can turn about the fulcrum when the lateral force is exerted against the impact location.

4. The breakaway sign post assembly as set forth in claim 3; and an anchoring post, said breakaway collar being removably fastened to the anchoring post.

5. The breakaway sign post assembly as set forth in claim 4; said anchoring post and said sign support post each comprising an I-beam formed from synthetic resin material.

6. The breakaway sign post assembly as set forth in claim 4, said breakaway collar including a pair of generally opposite facing recesses configured to respectively receive the anchoring and sign support posts.

7. The breakaway sign post assembly as set forth in claim 6, said breakaway collar including a floor which separates the recesses.

8. The breakaway sign post assembly as set forth in claim 7, said fulcrum about which the sign support post turns being spaced above the floor.

9. The breakaway sign post assembly as set forth in claim 6, said top edge being located between the fulcrum and impact location.

10. The breakaway sign post assembly as set forth in claim 3, said sign support post being releasably attached to the sidewall by an adhesive.

11. The breakaway sign post assembly as set forth in claim 3, said breakaway collar being integrally formed from synthetic resin material.

12. The breakaway sign post assembly as set forth in claim 3, said sidewall including a weakened hinge line which generally defines the fulcrum.

13. A breakaway sign post assembly comprising:

a sign support post; and a breakaway collar configured to support the sign support post in an upright orientation, said collar including a sidewall that at least substantially extends about the support post and presents an uppermost top edge, said sidewall retaining the support post in a manner to define a fulcrum about which the sign support post turns when a vehicle impacts and exerts a lateral force at an impact location on the support post, with the fulcrum being positioned below the impact location so that the support post will swing generally away from the vehicle, said sidewall including a zone of weakness projecting from the top edge toward the fulcrum and being configured to facilitate a portion of the sidewall to give way so that the support post can turn about the fulcrum when the lateral force is exerted against the impact location, said zone of weakness comprising at least one substantially vertical line of weakness.

14. The breakaway sign post assembly as set forth in claim 13, said at least one line of weakness comprising an open slot.

15. A breakaway sign post assembly comprising:

a sign support post; and a breakaway collar configured to support the sign support post in an upright orientation, said collar including a sidewall that at least substantially extends about the support post and presents an uppermost top edge, said sidewall retaining the support post in a manner to define a fulcrum about which the sign support post turns when a vehicle impacts and exerts a lateral force at an impact location on the support post, with the fulcrum being positioned below the impact location so that the support post will swing generally away from the vehicle, said sidewall including a zone of weakness projecting from the top edge toward the fulcrum and being configured to facilitate a portion of the sidewall to give way so that the support post can turn about the fulcrum when the lateral force is exerted against the impact location, said zone of weakness comprising a pair of spaced apart, substantially vertical open slots, said slots and the impact location being located on generally opposite sides of the assembly.

16. The breakaway sign post assembly as set forth in claim 15, said portion of said sidewall being defined generally between the slots.

17. A breakaway sign post assembly comprising:

a sign support post; and a breakaway collar configured to support the sign support post in an upright orientation, said collar including a sidewall that at least substantially extends about the support post and presents an uppermost top edge, said sidewall retaining the support post in a manner to define a fulcrum about which the sign support post turns when a vehicle impacts and exerts a lateral force at an impact location on the support post, with the fulcrum being positioned below the impact location so that the support post will swing generally away from the vehicle, said sidewall including a zone of weakness projecting from the top edge toward the fulcrum and being configured to facilitate a portion of the sidewall to give way so that the support post can turn about the fulcrum when the lateral force is exerted against the impact location, said sidewall being polygonal in shape to present a plurality of sides, said zone of weakness comprising a pair of spaced apart, substantially vertical lines of weakness in each of the sides of the sidewall.

18. The breakaway sign post assembly as set forth in claim 17, said sidewall being substantially rectangular in shape such that the sidewall has four sides and there are four pairs of lines of weakness.

19. The breakaway sign post assembly as set forth in claim 18, each of said lines of weakness comprising an open slot.

20. A breakaway sign post assembly comprising:

a sign support post; and a breakaway collar configured to support the sign support post in an upright orientation, said collar including a sidewall that at least substantially extends about the support post and presents an uppermost top edge, said sidewall retaining the support post in a manner to define a fulcrum about which the sign support post turns when a vehicle impacts and exerts a lateral force at an impact location on the support post, with the fulcrum being positioned below the impact location so that the support post will swing generally away from the vehicle, said sidewall including a zone of weakness projecting from the top edge toward the fulcrum and being configured to facilitate a portion of the sidewall to give way so that the support post can turn about the fulcrum when the lateral force is exerted against the impact location, said sidewall being substantially rectangular in shape to present four corners, said zone of weakness comprising an open slot defined along each corner.

21. A breakaway sign post assembly comprising:

a sign support post; and a breakaway collar configured to support the sign support post in an upright orientation, said collar including a sidewall that at least substantially extends about the support post and presents an uppermost top edge, said sidewall retaining the support post in a manner to define a fulcrum about which the sign support post turns when a vehicle impacts and exerts a lateral force at an impact location on the support post, with the fulcrum being positioned below the impact location so that the support post will swing generally away from the vehicle, said sidewall including a zone of weakness projecting from the top edge toward the fulcrum and being configured to facilitate a portion of the sidewall to give way so that the support post can turn about the fulcrum when the lateral force is exerted against the impact location, said zone of weakness comprising a pair of spaced apart substantially vertical lines of weakness, said portion of said sidewall being defined between the lines.

22. A breakaway sign post assembly comprising:

a sign support post; and a breakaway collar configured to support the sign support post in an upright orientation, said collar including a sidewall that at least substantially extends about the support post and presents an uppermost top edge, said sidewall retaining the support post in a manner to define a fulcrum about which the sign support post turns when a vehicle impacts and exerts a lateral force at an impact location on the support post, with the fulcrum being positioned below the impact location so that the support post will swing generally away from the vehicle, said sidewall including a zone of weakness projecting from the top edge toward the fulcrum and being configured to facilitate a portion of the sidewall to give way so that the support post can turn about the fulcrum when the lateral force is exerted against the impact location, said sidewall being substantially circular in cross-sectional shape, said zone of weakness comprising a plurality of weakness lines circumferentially spaced around the sidewall.

23. A breakaway sign post assembly comprising:

a sign support post; and a breakaway collar configured to support the sign support post in an upright orientation, said collar including a sidewall that at least substantially extends about the support post and presents an uppermost top edge, said sidewall retaining the support post in a manner to define a fulcrum about which the sign support post turns when a vehicle impacts and exerts a lateral force at an impact location on the support post, with the fulcrum being positioned below the impact location so that the support post will swing generally away from the vehicle, said sidewall including a zone of weakness projecting from the top edge toward the fulcrum and being configured to facilitate a portion of the sidewall to give way so that the support post can turn about the fulcrum when the lateral force is exerted against the impact location, said sidewall including a weakened hinge line which generally defines the fulcrum, said zone of weakness presenting a lowermost end spacing from the hinge line.

24. A breakaway sign post assembly comprising:

a sign support post; and a breakaway collar configured to support the sign support post in an upright orientation, said collar including a sidewall that at least substantially extends about the support post and presents an uppermost top edge, said sidewall retaining the support post in a manner to define a fulcrum about which the sign support post turns when a vehicle impacts and exerts a lateral force at an impact location on the support post, with the fulcrum being positioned below the impact location so that the support post will swing generally away from the vehicle, said sidewall including a zone of weakness protecting from the top edge toward the fulcrum and being configured to facilitate a portion of the sidewall to give way so that the support post can turn about the fulcrum when the lateral force is exerted against the impact location, said sidewall presenting a thickness that tapers toward as the top edge.

25. A breakaway sign post assembly comprising:

a sign support post;

an anchoring post; and a breakaway collar supported on the anchoring post and configured to support the sign support post in an upright orientation, said collar including a sidewall that at least substantially extends about the support post and presents an uppermost top edge, said sidewall retaining the support post in a manner to define a fulcrum about which the sign support post turns when a vehicle impacts and exerts a lateral force at an impact location on the support post, with the fulcrum being positioned below the impact location so that the support post will swing generally away from the vehicle, said sidewall including a pair of substantially vertical open slots projecting from the top edge such that a portion of the sidewall defined between the slots is located on a side of the assembly generally opposite from that of the impact location, said slots being configured to facilitate the portion to give way so that the support post can turn about the fulcrum when the lateral force is exerted against the impact location.

* * * * *